United States Patent [19]

Holiday

[11] 3,831,250

[45] Aug. 27, 1974

[54] METHOD AND APPARATUS FOR ASSEMBLING PRINTED CIRCUIT BOARDS

[75] Inventor: William G. Holiday, Overland Park, Kans.

[73] Assignee: King Radio Corporation, Olathe, Kans.

[22] Filed: June 21, 1971

[21] Appl. No.: 154,880

[52] U.S. Cl. .................. 29/203 B, 29/407, 29/430, 29/471.1, 29/626

[51] Int. Cl. .......................................... H05k 13/04

[58] Field of Search ....... 29/407, 626, 203 B, 471.1, 29/430

[56] References Cited

UNITED STATES PATENTS

| | | | |
|---|---|---|---|
| 3,216,101 | 11/1965 | Miller | 29/407 |
| 3,426,415 | 2/1969 | Countryman et al. | 29/203 B |
| 3,548,493 | 12/1970 | Hubbard | 29/203 B X |
| 3,568,295 | 3/1971 | Moran | 29/407 |
| 3,667,104 | 6/1972 | Chamillaro et al | 29/203 B |

*Primary Examiner*—Charles W. Lanham
*Assistant Examiner*—Joseph A. Walkowski
*Attorney, Agent, or Firm*—Lowe, Kokjer, Kircher, Wharton & Bowman

[57] ABSTRACT

The method of assembling circuit components on printed circuit boards includes the steps of aligning an apertured printed circuit board with a similarly apertured template,
color coding the apertures in said template,
illuminating said color coded apertures in said template,
viewing said illuminated colors through said apertures in said printed circuit board, and
placing said circuit component parts on said printed circuit board in accordance with the color appearing through the apertures in said printed circuit board.

A light station has a high intensity light source attached to the upper portion of an assembly station or dolly with a white Plexiglas panel located on the upper portion thereof. The end portions of the Plexiglas panel are provided with magnetic strips and the entire structure is located interiorly of a frame support. The side wall portions of the frame support are appropriately formed to locate a frame containing a printed circuit board in spaced relation with respect to the Plexiglas panel and to provide for the location of a suitably apertured generally opaque template. The template has matching magnetic strips thereon to facilitate the position of the template with respect to both the printed circuit frame and the Plexiglas panel. Circuitry is provided for the safe energization of the light source when utilized with a programmed line.

1 Claim, 7 Drawing Figures

INVENTOR
William G. Holiday

BY Seofield, Kokjer, Scofield & Lowe
ATTORNEYS

INVENTOR
William G. Holiday
BY Schofield, Hoffer, Schofield & Lowe
ATTORNEYS

METHOD AND APPARATUS FOR ASSEMBLING PRINTED CIRCUIT BOARDS

BACKGROUND AND BRIEF DESCRIPTION OF THE INVENTION

The manufacturer and/or assembly of printed circuit boards has long been a bottleneck in the electronics industry. Such a process would generally comprise a single station with an assembler being required to construct the entire printed circuit board. Quite often, this could result in the placing of as many as 60 to 80 different components on the board with a total of from 100 to 300 parts and would require that each component is placed by hand through the correct holes in the board, bending the leads over the back, soldering the board in the appropriate places both the front and back and cutting off the excess lead lengths from the back of the board. This construction is generally accomplished by having the assembler observing a sample of a completed printed circuit board in conjunction with an engineering assembly drawing showing the location of the various component parts. In this manner, both the positioning and the part location (from the sample) in conjunction with the part number (from the drawing) was indicated to the assembler. The component parts would be located in bins in close proximity to the assembler with the part number on the bin so that cross-reference between the drawing and the sample and then with the bin was dependent on the assembler to make the correct component part choice. Of course, this meant that the assembler was constantly referring back to the sample and to the drawing and thence again to the identified bin making sure each time that the correct component part was located in the correct location and in the proper position.

In the above-described situation, the assembler was generally located at a bench with the bare board and parts placed on the bench in close proximity so that the entire assembly operation was performed at one location and removed therefrom when completed. The total elapsed time for installation of a single component part having two leads normally associated therewith usually approached one minute or slightly more. Therefore, the entire board assembly could be and generally is a long and tedius operation.

The above process was somewhat automated by the utilization of a programmed line manufactured under the trademark LINEMASTER by the Sandefur Engineering Company, Inc. of Lawndale, California. This programmed line is generally comprised of an oval track which circumscribes a suitable workbench area with a printed circuit board support being located upon movable dollies. An electrical control unit facilitates the movement of the interconnected dollies along the above-mentioned track so that the work station may be transferred after an adjustable transfer delay time. An audible warning signal sounded prior to the transfer of movement. In this manner, the number of component parts are reduced that each assembler is required to install at a particular work station. Accordingly, the assembler will install, for example, from one to eight different component parts with a total of 12 to 16 total parts per station and will install the same component parts in the same location prior to movement of the particular work station after a predetermined amount of time.

The primary object of my invention is to provide a unique method and apparatus for facilitating the manufacture and assembly of electrical circuits utilizing printed circuit boards.

Another object of the invention is to provide a unique method for assembling electrical circuits utilizing printed circuit boards including the steps of aligning an apertured printed circuit board with an apertured template, color coding the apertures in said template, illuminating said color coded apertures in said template, viewing said illuminated colors through said apertures in said printed circuit boards, and placing said circuit component parts on said printed circuit board in accordance with the color appearing through the apertures in said printed circuit board.

Another object of the invention is to provide a unique apparatus for holding a light source, board holder with printed circuit board, and a template during the assembly of electrical circuits on said printed circuit board. It is a feature of the invention that this apparatus properly supports and holds the above-described combination of elements for efficient viewing and for quick and fool proof orientation.

A further object of the invention is to provide a unique method of assembling electrical circuits on printed circuit boards in order to improve the reliability of the completed product and to reduce the amount of rework often times associated with assembly line production units.

Another object of the invention is to provide a unique method of the character described above that will not require rigorous attention and intensive concentration on the part of the worker doing the circuit assembly task.

A further object of the invention is to provide a unique method for assembling electrical circuits on printed circuit boards that speeds up the assembly of same in that no drawings or samples need be referred to during the assembly process.

Another object is to provide a unique method of assembling electrical circuit parts on printed circuit boards that reduces the need for frequent removal and replacing of incorrect circuit parts and thereby upgrades the quality or reliability of an assembly product. It is a feature of the invention that the accuracy of locating the individual parts or components on the printed circuit boards is improved without, at the same time, increasing the skill or educational or intellectual background and ability heretofore required.

A further object of the invention is to provide a uniquely constructed light station for use in either assembly line operation wherein only a portion of the circuit is assembled by an assembler at a work station or in a static assembly operation where the entire circuit is assembled at one light station.

A further object of the invention is to provide a unique method and apparatus for assembling electrical circuits on printed circuit boards which utilizes different colors to co-ordinate the positioning of electrical circuit components thereon.

Another object of my invention is to provide in a light station of the character described, a unique means for locating an apertured template below an apertured printed circuit board prior to the assembly of electronic components thereon. It is a feature of this object that both the template and selected portions of the light station are magnetized to facilitate proper alignment of the template relative to the apertured printed circuit board.

A further object of my invention is to provide a light station of the character described above that is utilizable with a pace line and which includes means for automatically turning off the station light power source during station transfer.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views.

Figure 1:
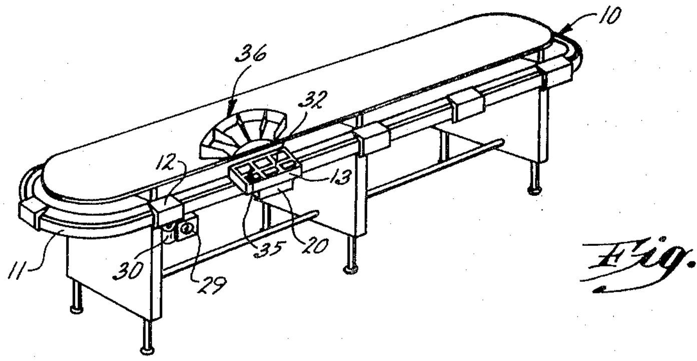
FIG. 1 is a perspective view of a pace line continuous transfer track system with a light station embodying the invention shown mounted on only one of the assembly station dollies.
Figure 6:
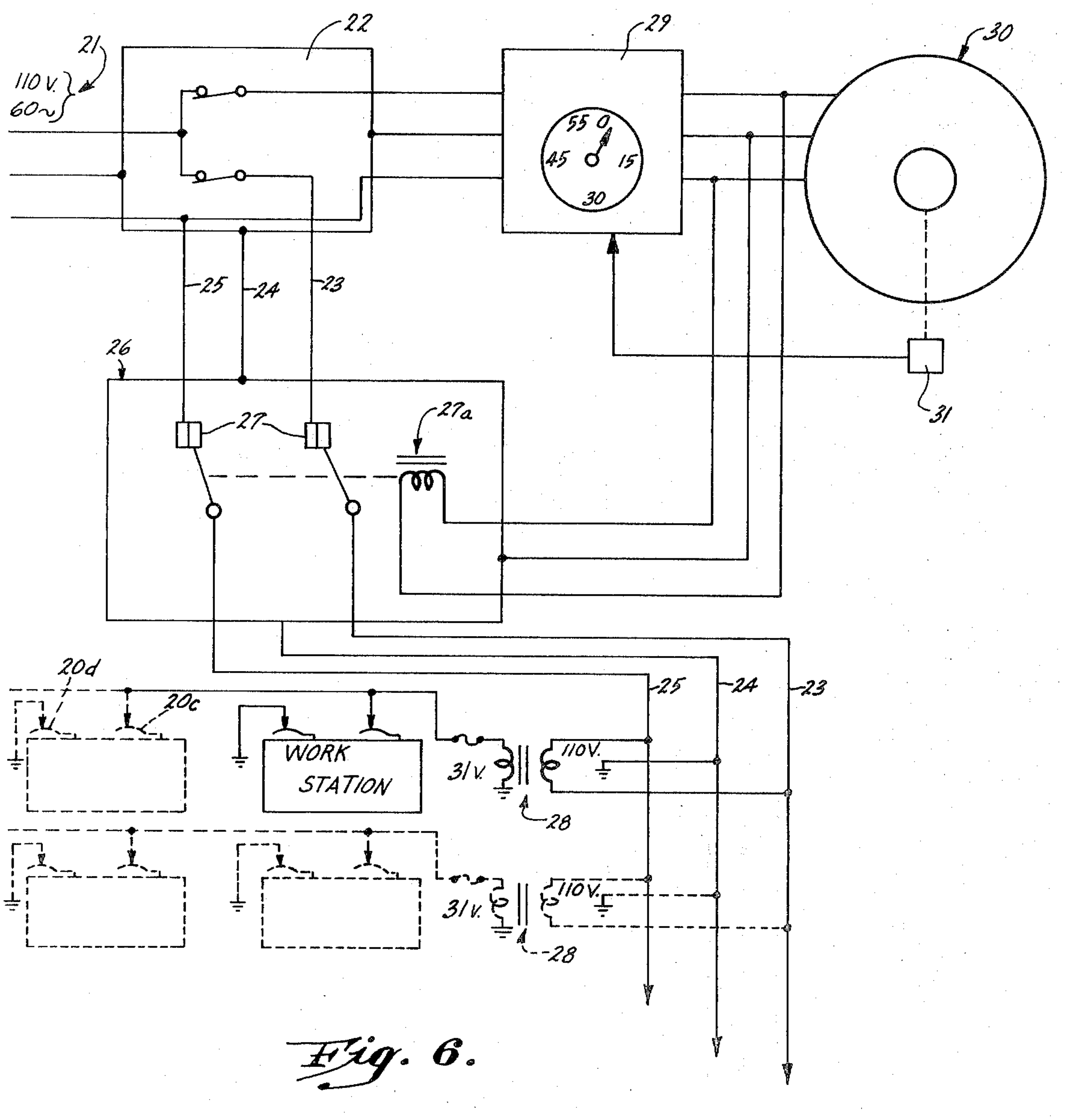
FIG. 6 is a schematic circuit diagram of the power supply and control of the individual lights at their respective work stations.

Turning now more particularly to the drawings, the continuous transfer track system or pace line is generally shown in FIG. 1 and represented by the numeral 10. While other continuous transfer track systems and stationary or static assembling stations may utilize portions of the subject invention, the pace line manufactured by Line-Master Products, a division of Sandefur Engineering Company, Inc. of Lawndale, California may be conveniently utilized. This particular type of continuous transfer track system is described in detail in the Line-Master Products 1969 catalog beginning at Page 18. The unit is basically comprised of a table top with leg supports. An oval track 11 circumscribes the upper surface of the table top supports a plurality of dollies 12 for movement thereon. A control unit 29 that will be described in more detail with respect to FIG. 6, is provided to move the dollies from work station to work station generally under a preselected program so that each assembly operation is alotted a predetermined amount of time for completion. The control unit will include a heavy duty 110 volt 60 cycle gear motor (30) and controls which can be mounted at any work station on the line. The number of work stations or dollies (there generally being twice as many dollies as work stations) can be controlled by one unit in that after a dolly has been located at a work station for a preset and variable time per stop (between 0 to 15 minutes), the gear motor will be energized to effect the proper movement of the dollies. Each dolly 12 will eventually stop in front of a work station with a light station, which will be described later as attached thereto.

Each one of the above-mentioned light stations is comprised of a frame support 13 which is mounted directly to a corresponding dolly 12 with a spacer 14 located therebetween. Frame support 13 is constructed of aluminum and holds a light box 15 in a snug sliding fit to the interior thereof. The rectangular light box has an open top and is conveniently manufactured from steel with the interior painted white. A pair of light rails 16 with a rubber channel along the upper portion thereof to support a 40 watt serpentine neon lamp 17 thereon. The upper portion of the rectangularly shaped light box 15 is closed by a milk white Plexiglas panel 18. The end portions of Plexiglas panel extend beyond the end portions of light box 15 and have strips of magnetic material 19 embedded on the lower side thereof along the overhanging end edge portion. The box is provided with suitable brackets (not shown) which permits the entire unit to be firmly attached and then as a unit fixedly mounted onto the frame support 13 in any convenient manner. Accordingly, with the strips of magnetic material 19 being located on the undersurface of the Plexiglas panel 18, the upper surface of the panel is both smooth and spans the entire dimension from end to end of the interior of frame support 13.

A power supply chassis 20 is mounted on the substantially vertical front face of each dolly 12. The chassis is basically comprised of a metal box and contains a current limited transformer (see FIG. 7) having a 31 volt primary and a 2,000 volt secondary with a toggle switch 20*a* located at the bottom thereof to turn off each individual light station. The secondary of the transformer which appropriately interconnects with the corresponding neon lamp 17 for purposes of selectively energizing same.

Figure 7:
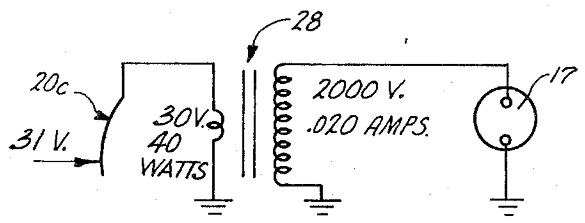
FIG. 7 is a schematic diagram of the electrical circuitry at the individual light station.

A brush block assembly generally indicated by the numeral 20*c* and 20*d* is located behind each of the dollies carrying a light station thereon and extends rearwardly to and in contact with the forward face of the track 11. An assembly 20*b* is comprised of two flexible beryllium copper contacts (20*c* and 20*d*), one of said contacts (20*d*) being set directly to the rail 11 that the dolly is mounted on for a ground terminal and the other contact (20*c*) operatively connectable with a 31 volt line. This arrangement is schematically shown in FIGS. 6 and 7, however, it should be noted that a copper strip is embedded on track 11 at a particular work station for use with the brush block contacts 20*c* and 20*d* and is tied to a 31 volt line. For instance, the schematic diagram in FIG. 6 indicates that a conventional 110 volt 60 cycle input is available at numeral 21 to a breaker box diagrammatically shown at 22. The power input including the hot line 23, the ground 24 and the neutral connection 25 are then directed to a lamp shutdown relay box 26 which includes a double pole single throw normally closed relay 27 having a 110 volt solenoid coil 27*a* associated therewith. Accordingly, transformers 28 step the 110 power circuit across lines 23 and 25 down to the 31 volt secondary that is delivered to the various work stations (W.S.). Accordingly, the arrival of a dolly at a work station causes the brush contact 20*c* to "make" with the 31 volt power line while the brush contact 20*d* effectively grounds the system through the light station thereby completing the circuit and turning on lamp 17 at a particular light station.

The above circuit further includes a timer 29 for the transfer of dollies to a different work station, a motor and gear head assembly 30 and a sense 31 switch which detects when the transfer stations is completed to shutdown the motor and gear head assembly. As will be seen, when the timer energizes motor and gear head assembly 30, power is directed to solenoid coil 27*a* which results in the opening of the double pole single throw contacts 27 thereby disconnecting each work station. As soon as the motor stops and the dollies are appropriately located at the proper work stations, the voltage to coil 27*a* is cutoff and the relay contacts 27 return to the normally closed position thereby energizing the light stations at the particular work stations.

Figure 2:
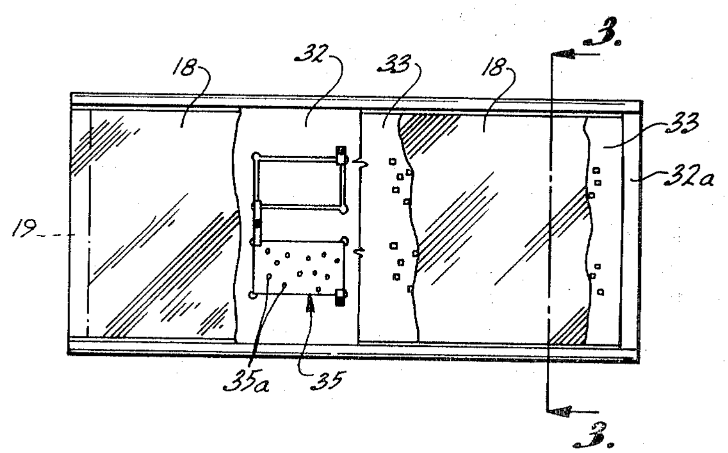
FIG. 2 is a top plan view of a light station with the left-hand portion of both the printed circuit board frame holder and the template broken away to show the upper surface of the Plexiglas panel and the right-hand portion of the frame holding the printed circuit boards are broken away to show the upper portion of the apertured template with the transparent colored strips placed thereon.
Figure 3:
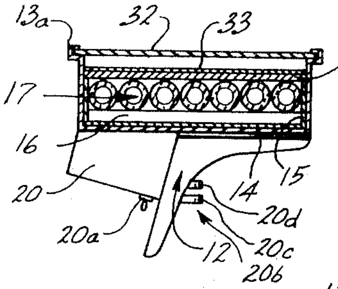
FIG. 3 is a sectional view of a light station taken along the line 3—3 of FIG. 2 in the direction of the arrows.

The printed circuit board is supported and held in place on the pace line by the channel shaped upper portions of the opposed sides of frame support 13. These opposed channels, hereinafter referred to by the numeral 13*a*, are oriented to slidably mate with the side edge portions of aluminum carrier frame 32 that supports and holds a printed circuit board (or a plurality of printed circuit boards) for an entire assembly operation. The carrier frame shown in FIGS. 2 and 3 are of the type that have holes cut to the dimensions and milled to correspond to a specific board size. Another type (not shown) is a universal fixture that has movable sides capable of supporting and carrying virtually any width or length of circuit board.

The proper location of aluminum carrier frame 32 within the bracket portions of the support frame (13*a*) is assured in that the length dimension of the aluminum carrier is exactly the same as the support itself. Accordingly, when the edges of the carrier frame align with the outer edges of the support frame, the proper reference between the carrier frame 32 and the magnetic strips which are located on the Plexiglas panel 19 will be obtained. The space between the lower surface of the carrier frame 32 and the upper surface of the Plexiglas panel 18 is sufficient to allow the circuit component parts to be inserted through the printed circuit board without touching or interfering in any way with the line system itself. Also, this space allows for the positioning of the opaque color coded template (which will be described later) that is locatable on top of Plexiglas panel 18.

Figure 5:
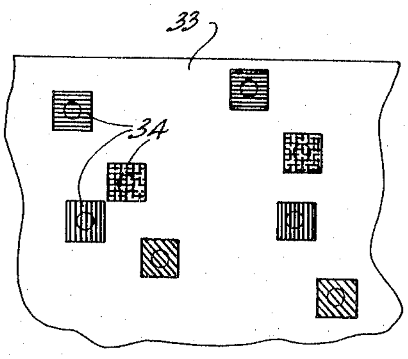
FIG. 5 is an enlarged top plan view of a portion of the template showing the various apertures covered by transparent colored tape.
Figure 4:
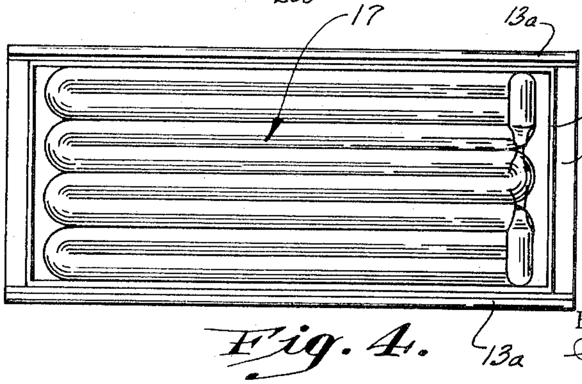
FIG. 4 is a top plan view of the neon light source inside the light box with frame support with the Plexiglas panel removed therefrom.

As suggested above, each assembly station on the pace line has a template 33 for the particular parts or components that are to be installed at that particular station. The template 33 is basically an opaque plastic sheet that has been "drilled out" behind the apertures in the printed circuit board for the parts for that particular station. The holes (or apertures) have then been covered by transparent colored plastic tapes 34 as shown in FIG. 5. These plastic tapes (34) indicate to the assembler by color code as to which particular part or parts are to be installed in the various holes or apertures in the template. In effect, the tapes provide a lens action for neon light 17 behind Plexiglas panel 18 in accordance with their particular color. Accordingly, as the assembler looks down from the top of the work station and on to printed circuit board 35 with the associated apertures 35*a* therein, the various colors are illuminated through the holes 35*a*.

These colors correspond to the circuit parts located in a divided bin 36. Stated another way, certain component parts which will be color coded red or blue, etc. are located in a portion of the bin 36 that corresponds to their particular color. Accordingly, when a red light appears through the apertured printed circuit board by means of the presence of the lamp 17 illuminating that particular color, the corresponding red coded circuit component will be inserted through the same color illuminated apertures.

As suggested above, the template 33 is positioned on the upper surface of Plexiglas panel 18 and is appropriately located by the presence of its two magnetic strips 32*a* coming into registration with the magnetic strip 19 which is located under the outer edge portions of Plexiglas panel 18. The template magnetic strips and the Plexiglas magnetic strips are of equal dimension so that when template 33 is slid into the light station on top of Plexiglas panel 18, there will be a definite snap effect felt as the magnets line up to provide the correct orientation between the template and the printed circuit board 35 (which is located in the carrier directly above same). Once properly located on the Plexiglas panel 19, the illuminated colored holes will appear through the proper hole or aperture in the printed circuit board. If, however, the assembler is not particularly satisfied with the intensity of light appearing through the printed circuit board due to a parallax condition, the assembler may still move the template either slightly up and down or back and forth within the strength of the magnetic field to optimize the visibility of the color coded apertures.

The process described above is arranged so that all parts being assigned a particular color will be placed in the printed circuit board apertures that are illuminated with the same color. However, in some cases, a component such as a resistor will have two leads extending therefrom (that are usually preformed) or components may have vertical leads such as disc capacitors. In this case, both holes or apertures in the printed circuit board will be illuminated with the same color for installation purposes. In the case of components with two leads that require a polarity installation such as diodes, one end of the location will have a color coded aperture while the polarity or directional end of the component part will be illuminated with the white or black light. For components with multi-leads such as transistors or integrated circuits, only the key lead will be color coded for installation purposes and due to the preformed condition of the component part, it will be obvious to the assembler as to where the remainder of the leads will be placed.

It is further contemplated that the bins behind the work station will have a number associated therewith to indicate the exact number of component parts per color that will be installed at that particular work station. The assembler is then required to remove from the proper bin the number corresponding to that particular color before beginning with the installation process. This has a distinct advantage in keeping down errors in that with all component parts of a particular color installed, there should be no more holes or apertures in the printed circuit board that are illuminated with the corresponding color. If the color still shows, it is obvious that an error has been made. In a similar manner, if all color areas have been filled and there are still component parts remaining, it is a further indication of an error. In addition to the number and the color of a particular bin, if the component part has polarity, there will be a coded tab placed in the bin to indicate this condition.

After assembly for a particular station is complete, the assembler removes the template from the top of a Plexiglas panel 18 and awaits for the next dolly to position a light station at the work station. The process of sliding the template in place beneath the printed circuit board on top of the Plexiglas and installation of the particular color coded components is again repeated. This process is carried out from station to station with each assembler installing at their position the same selected components on the printed circuit board as the line moves in a clockwise direction from the first to the last station until the board has been completely filled. A completed board is then ready for soldering and the carrier holding the board is removed from the frame support and placed on a conveyor system to be wave soldered. This removal of the frame support and the placement of same on a conveyor system is a manual operation even though the printed circuit boards remain in an aluminum carrier 32 as they are conveyed through the wave soldering process. After the board is soldered and cleaned, it is then removed from the aluminum carrier and installed in a mechanical holding device that retains same in a fixed horizontal plane, usually upside down, so that a suitable machine tool device may be used to sheer off the leads that protrude through the back of the printed circuit board to a fixed dimension.

The entire concept described above is also adaptable to a single or static station lighted system. In this process, the lighted station would be stationary and the template would be placed in a similar manner on the Plexiglas panel. However, the templates would be provided to the assembler in sequence and the bin or bins may be attached to a ferris wheel type or lazy susan arrangement so that a different set of component parts would be presented to the assembler with each new template. This would eliminate the need for a moving line and would essentially utilize all of the steps of the process to permit a single assembler to complete a printed circuit board but yet retain the advantages of sequentially placing a small number of component parts on the printed circuit board during a prescribed time interval.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A system for facilitating the assembly of printed circuit boards, said system comprising a light station, said light station having a light source and a means for holding an apertured printed circuit board in spaced relationship with said light source, a color coded template having translucent colored material located over preselected areas of said template, means for supporting and aligning said template between said light source and said printed circuit board so that said printed circuit board apertures will be illuminated by said light source and with the illuminated color of same corresponding to the color code, means for locating electrical components in close working proximity to said light station, said electrical components being color coded to correspond with the color of said illuminated printed circuit board apertures, means for providing relative motion between said component locating means and said light station, means for automatically activating said light source in said light station for a predetermined time in response to the arrival of one of said light station and electrical component locating means in said working proximity, and means for automatically timing and controlling said motion providing means thereby permitting said component locating means and said light station to be in working proximity with each other for a preselected time.

* * * * *